C. S. Jewell. Weeding Implement.
74371
PATENTED
FEB 11 1868
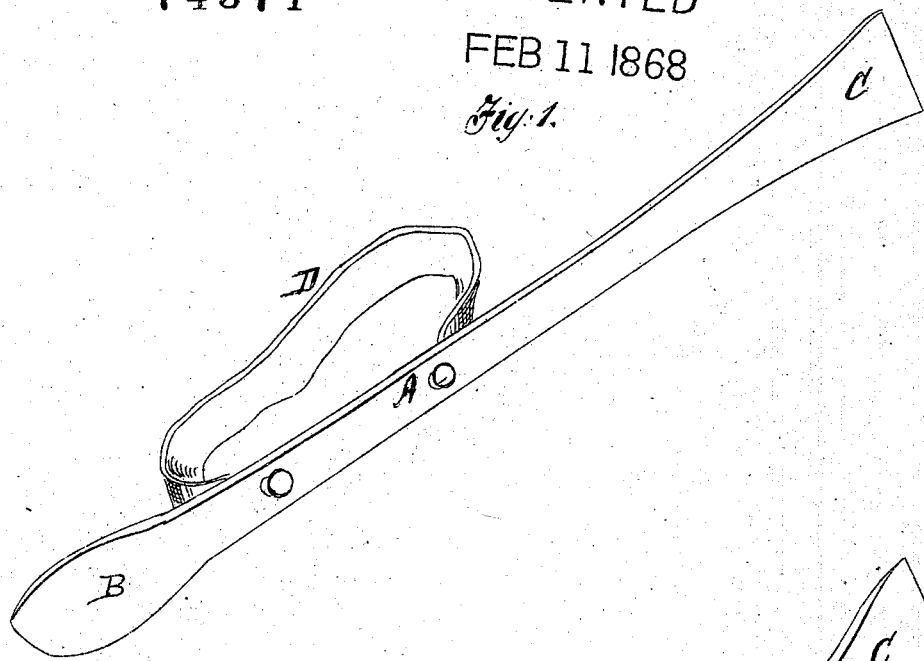
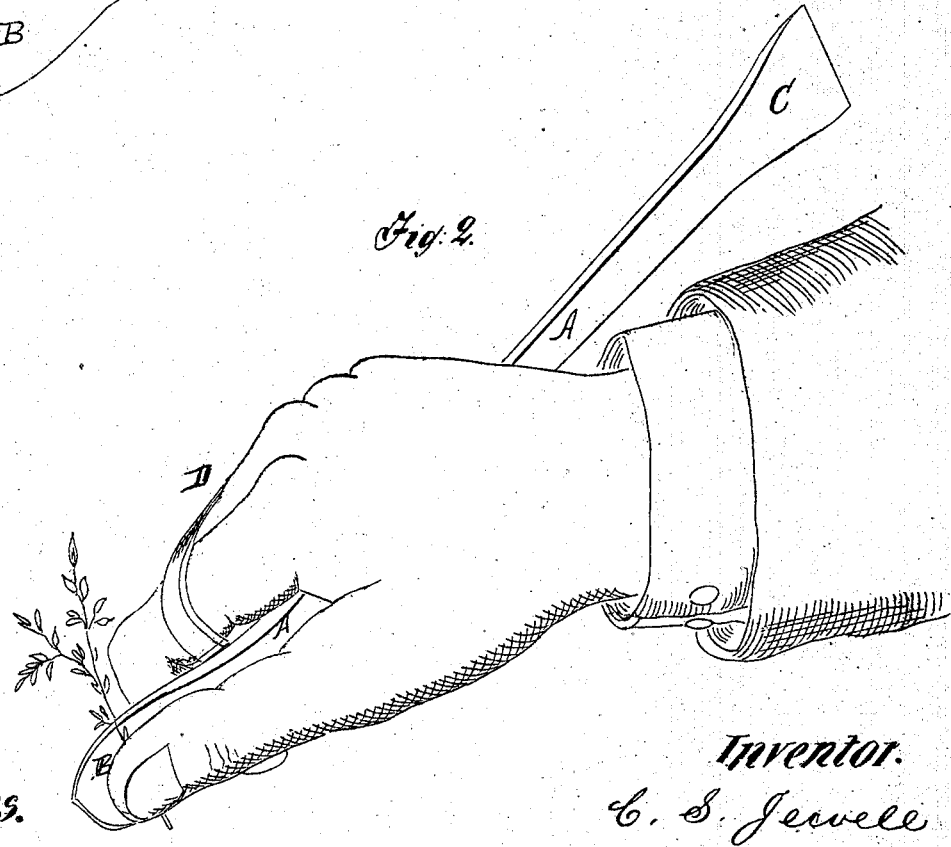
Witnesses.
Inventor.
C. S. Jewell
per Munn & Co
attorneys

United States Patent Office.

C. S. JEWELL, OF BLACK'S MILLS, NEW JERSEY.

Letters Patent No. 74,371, dated February 11, 1868.

IMPROVEMENT IN WEEDING-IMPLEMENT.

The Schedule referred to in these Letters Patent and making part of the same.

TO ALL WHOM IT MAY CONCERN:

Be it known that I, C. S. JEWELL, of Black's Mills, in the county of Monmouth, and State of New Jersey, have invented a new and improved Weeding-Implement; and I do hereby declare that the following is a full, clear, and exact description thereof, which will enable those skilled in the art to make and use the same, reference being had to the accompanying drawings, forming part of this specification.

Figure 1 represents a perspective view of my improved weeding-implement.

Figure 2 is a perspective view of the same, showing it in operation.

Similar letters of reference indicate corresponding parts.

This invention relates to a new weeding-implement, which is so arranged that by its aid noxious weeds can be easily drawn out of the ground without cutting them.

The invention consists in the use of a metal or other bar, having a curved plate near one end, which, when the bar is held in the end, is placed against one side of the plant to be withdrawn, which is held by the thumb against the plate. The bar is then turned so as to bend the stem of the plant around the lower edge of the plate, and can then be easily extracted. On the other end of the bar is formed a chisel, by which two long roots may be cut off, if desired. The bar may be provided with a strap, by means of which it is fastened to the hand, so that the hand will be but little fatigued by continuous weeding operation.

A represents a bar, made of wood, metal, or other suitable material. B is a curved plate, attached to or formed on one end of the bar A, as shown, while the other end of the bar is provided with a chisel, C, for cutting roots and for crumbling the ground. A strap, D, may be secured to the bar A, by means of which the same can be fastened to the hand, as is clearly shown in fig. 2.

The operation of the device will be easily understood from fig. 2, in which it is represented in working operation.

Having thus described my invention, I claim as new, and desire to secure by Letters Patent—

As a new article of manufacture, a weeding-implement constructed as described, and consisting of the plate A, one end, B, of which is curved and flattened, and the opposite extremity, C, forming a chisel, provision being made for the attachment of a strap, D, all as set forth.

C. S. JEWELL.

Witnesses:
WM. H. REID,
J. R. JEWELL.